Sept. 14, 1965

F. ANDERSON 3,205,962

PNEUMATIC TIRE HAVING DRIVE
MEANS CONTAINED WITHIN

Filed Jan. 25, 1961

INVENTOR
FROHMAN ANDERSON
BY
Borst and Borst
ATTORNEYS

Sept. 14, 1965

F. ANDERSON 3,205,962

PNEUMATIC TIRE HAVING DRIVE
MEANS CONTAINED WITHIN

Filed Jan. 25, 1961

Inventor
FROHMAN ANDERSON

By
Borst and Borst Attorneys

Sept. 14, 1965

F. ANDERSON 3,205,962

PNEUMATIC TIRE HAVING DRIVE MEANS CONTAINED WITHIN

Filed Jan. 25, 1961

INVENTOR
FROHMAN ANDERSON

BY
Borst and Borst
ATTORNEYS

Sept. 14, 1965 F. ANDERSON 3,205,962
PNEUMATIC TIRE HAVING DRIVE
MEANS CONTAINED WITHIN
Filed Jan. 25, 1961 6 Sheets-Sheet 5

INVENTOR
FROHMAN ANDERSON
BY
Borst and Borst
ATTORNEYS

United States Patent Office 3,205,962
Patented Sept. 14, 1965

3,205,962
PNEUMATIC TIRE HAVING DRIVE MEANS
CONTAINED WITHIN
Frohman Anderson, 3320 S. 5th St., Las Vegas, Nev.
Filed Jan. 25, 1961, Ser. No. 84,883
3 Claims. (Cl. 180—10)

This invention relates to self-propelled steerable traction vehicles and particularly to vehicles in which there is an individual motive power device for each wheel.

More particularly the invention relates to such vehicles in which the wheels have pneumatic tires and is especially adapted for embodiment with wide tread tires.

One of the objects of the invention is to provide a wheel construction of the said type in which the motor mechanism is contained within the axial dimension of the tire.

Another object is to combine a friction brake mechanism with the motor mechanism in the tire contained apparatus.

Another object is to allow for independent application or removal of either the tire or of the combined motive and brake mechanism without such act affecting the functioning or operative condition of the other part.

Another object is to provide means for air-cooling the motor which will be effective for exclusion of moisture as well as solid material in any form from the motive apparatus contained within the tire, which will be effective for this purpose even under a condition when the wheel is wholly immersed in water, or is running in mud or sand, snow or the like.

Another object is to provide a mount for the wheels which will allow the wheel axes to tilt relative to the body or frame of the vehicle.

Other objects and special purposes of the invention will later appear.

The invention is designed and particularly adapted for embodiment with tubeless pneumatic tires which are intended and have special potential for off-the-road terrain, as for example, on large lawns, golf courses and the like where it is desirable to avoid vehicle tracks and other superficial damage to fairways, greens and like areas. Such tires, for example, are made and sold by The Goodyear Tire and Rubber Company under the trademark "Terra-Tire" and a characteristic of them is that they have high flexibility, low inflation pressures and maximum mobility in sand, snow and soft soil conditions. These tires are designed to provide reduced rolling resistance and high tractive effect and consequently have wide tread surface and have proportions comparable to those of lawn rollers.

The invention therefore comprehends a construction in which the beads about the hub openings of the tire are air sealed to an axial tube that extends through the tire and functions as a mounting rim for the tire. The width of the tire, that is, its axial dimension, is such that the axial tube is of a length to house the motor and brake mechanism entirely within the tire between its side or end walls.

Furthermore, the tube is of substantially the same diameter as that of the hub openings in the end walls of the tire, thus providing the requisite dimension for accommodating the motor and brake mechanism; and a feature of the invention is the special construction of the tube with its exact fit in the hub openings of the tire and the clamping rings which are of large diameter, whereby they may be assembled with a clamping ring on each tube end inside the tire.

This axial tube which serves as a hub and axle for the tire, also serves as the housing for the motor, gearing and brake mechanism and this tube contained mechanism is designed to be slid into and out of the tube, which, in accordance with the invention, may be done without affecting the inflation of the tire. The internal mechanism is in part contained in a shell which is keyed to rotate with the tube and tire but which slides out with and is a unitary part of the motor and brake assembly. The key, however, which rotatively ties the shell to the tube, remains in its keyway in the tube when the tube contents are removed, and this key has in it the valve controlled air passage for inflating the tube. Hence the removal of the tube contents does not affect the tire inflation. And likewise the removal or replacement of a tire on the tube does not affect the relation of the tube contents and the tube.

In accordance with the invention, the interior dimension of the tube is slightly larger in the portion or chamber occupied by the motor than it is in that occupied by the shell, so that the shell fits snugly and provides an adequate bearing support for the motor but slides freely in the motor chamber region of the shell interior. Preferably the outer periphery of the shell between two end portions is reduced and is free of the tube wall, thus providing a support at each end of the shell but minimizing the contact area between the shell and tube and facilitating the removal and insertion of the motor and brake unit.

For air cooling the motor, the invention contemplates effective means for sealing the motor and brake mechanism in the tube with air sealed openings in the end or hub caps with which communicate through hermetic connections flexible air conduits which extend up an indeterminate distance above the wheel so as to provide air circulation over the motor even though the shell be submerged. The air pressure may be provided by a fan operated in the motor case and air passages direct the air outside the motor casing between the shell and tube into the brake chamber with which the air conduit at that end communicates.

In accordance with the invention, a gear chamber is provided in the shell between the motor and brake chambers which is sealed from the other chambers and contains lubricating oil. The shell has two longitudinal passages in its wall open at its outer end and leading into the gear chamber. Removable plugs close these passages and the oil is introduced and drained through these passages which may also be used for flushing out the gear chamber.

Each wheel is preferably constructed in accordance with the features above mentioned and in addition each wheel is preferably so mounted as to be independently tiltable with respect to the vehicle. For this purpose the invention contemplates that the end or hub caps for each axial tire mounting tube be provided on its outer face with a horizontally pivot pin at right angles to the axis of the tube, and that an arm connect each pivot pin to the frame or body of the vehicle. To this end, it is contemplated that the pair of arms for each wheel be pivoted on the respective pins and be pivotally connected to the vehicle through parallel linkage so that the two arms will remain parallel but allow the wheel axis to tilt with respect to the horizontal.

Other objects, advantages and novel features of the invention will appear from the following description of the embodiment of the invention illustrated in the accompanying drawings to which reference is now made.

Figures 1, 8:
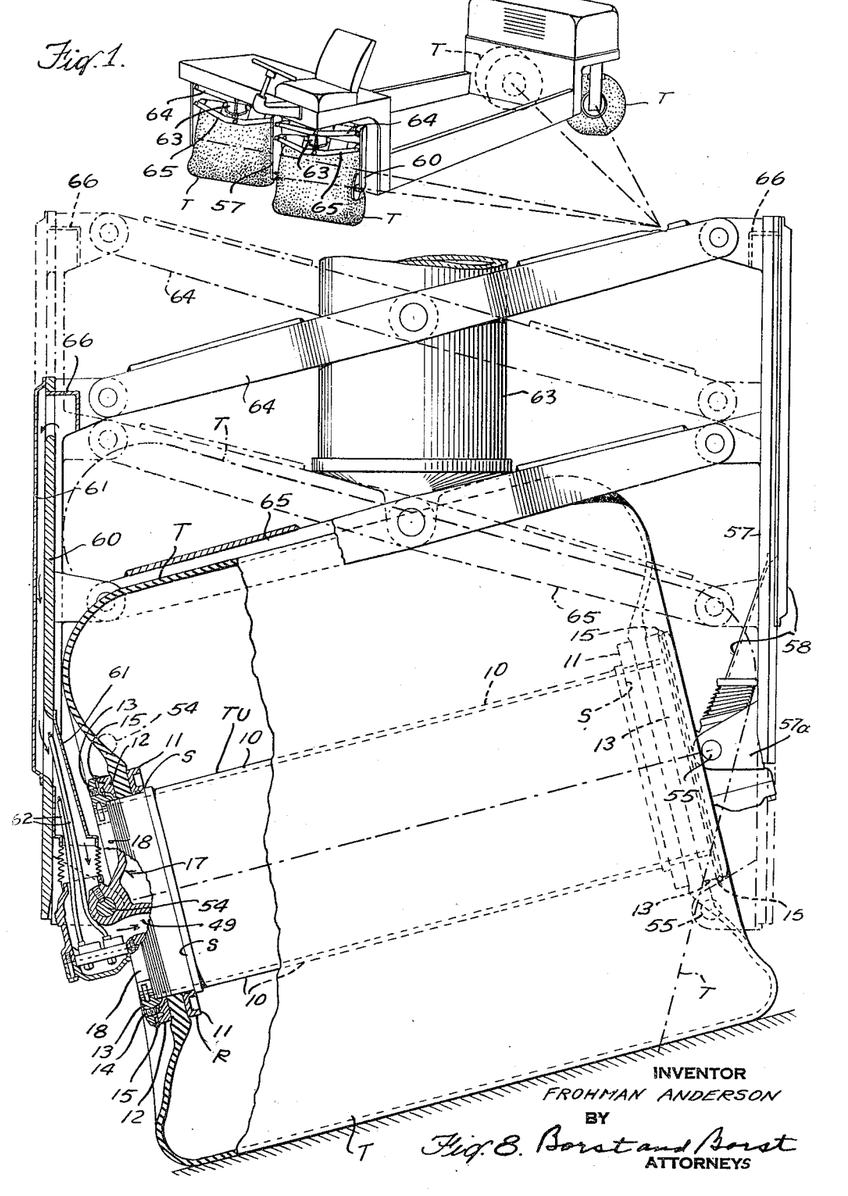
FIG. 1 is a perspective view of a vehicle having a wheel construction which embodies the invention.
FIG. 8 is a diagrammatic enlarged elevation partially in section of a wheel and connecting and supporting parts showing the wheel in tilted relation to the said parts.

The type of vehicle to which the invention is applied is illustrated in FIG. 1. As appears, it is a utility or work vehicle having four steerable wheels with wide, low pressure tires and load supporting platform body which is here shown as positioned close to the ground and in practice is adjustable. The support for the wheels and their connection with the body are indicated in this view.

The tires shown have smooth tread and have an outside axial dimension substantially equal to the outside diameter. They are The Goodyear Tire and Rubber Company "Terra-Tire" designated as the "24 x 24—8R Smooth" tire, having a twenty-four inch outside axial length, a twenty-four inch outside diameter and an eight inch hub opening on each end. It is a tubeless tire beaded and reinforced about its hub openings and in use is inflated up to fourteen pounds air pressure, depending upon the load. Such tire of course is soft and yielding and will make a minimum impression on the terrain over which it runs.

As has been pointed out, the invention contemplates disposing a power unit in each tire in such a way that the power unit is wholly contained within the tire and the tire and contained unit constitute the wheel. For these tires with eight inch openings, the conventional axles are five inches in diameter and the integral flanges which are the inner bearing members against which the bead about the tire opening is clamped air tight, are ten inches in diameter. This provides for enough play for the flanges to be worked through the smaller hub openings in the tire end walls.

It is obvious that larger than a five inch tube is required to house a power unit which will supply power requisite to drive the wheels of a vehicle of the type shown and the invention contemplates an axial tube for housing the power unit which has an outside diameter the same as that of the hub openings in the tire and fits in those openings and clamps the bead about the tire opening on each end between inside and outside clamping rings which are of larger diameter than that of the tire opening. Specifically in the commercial embodiment the holes are eight inches, the tube is eight inches and the rings are ten inches in diameter.

The way that the axial tube is inserted in the tire will be understood from reference to FIGS. 9 through 18. The tire T has a hub opening H on each end. The axial tube TU has the same diameter as that of the holes and near each end has a circumferential boss providing an outwardly facing abutment shoulder S. The length of the tube and the disposition of the shoulders are such that when the tube is in the tire it extends through the tire, spinning the openings, with the shoulders within the tire and the ends of the tube protruding through the respective openings. A clamping ring R, which is separable from the tube and has an outside diameter in this case of ten inches, fits over each end of the tube and bears against the shoulder S. The extreme ends of the tube are screw threaded and, as will later be seen, outer clamping rings slide over the protruding tube ends and are urged into clamping relation with the inner rings which are abutting against the shoulders by members which screw on the threads. The steps required to get the tube in the tire with the inner rings bearing against the shoulders will now be described.

Figures 9, 9A, 10, 11, 12:
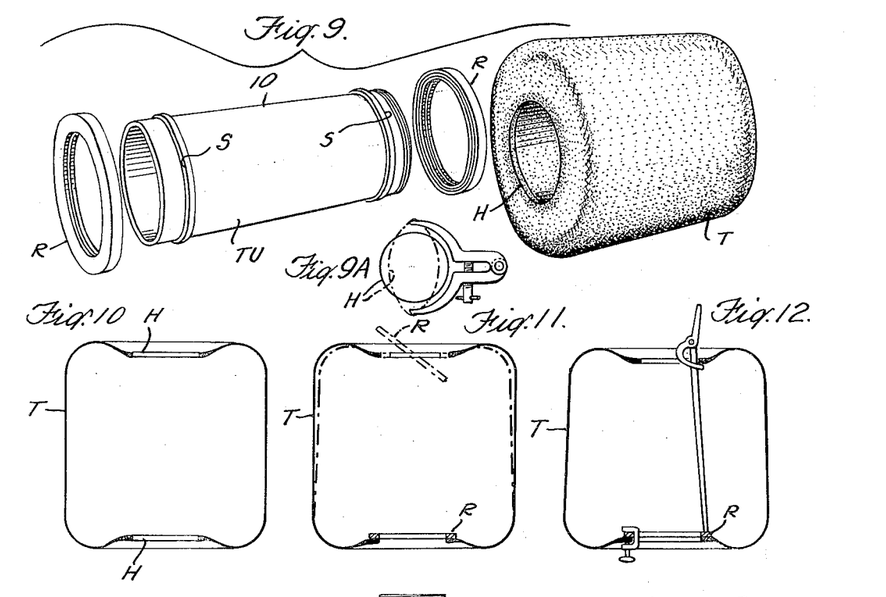
FIG. 9 is an exploded view showing in perspective a tire and the axial tube which is the housing for the motor and brake mechanism and is to be inserted in the tire together with the two inner clamping rings.
FIG. 9A is a detail of a tool used to distort a hub opening of the tire for the admission of the inner clamping rings and diagrammatically showing the opening in its normal shape in full lines and in the distorted elliptical shape in broken lines.
FIGS. 10 to 18, inclusive, illustrate diagrammatically a tire in section and the successive steps taken in inserting the axial tube together with the tools used in said operation.

As shown in FIG. 10, the tire is preferably placed on its end or side. The upper opening H is first pulled into elliptical shape by the tool of FIG. 9A and the ring R is inserted as shown in FIG. 11, being shown in dotted lines as it enters the opening H the elongated axis of which is at right angles to the plane of the paper. It is then dropped down to the position shown in full lines and preferably is secured in that position by a clamp, as indicated in FIG. 12. In this position, it is in the tire and lies concentric with the bottom opening H.

Figure 13:
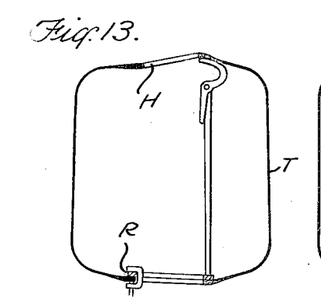
Figures 14, 15:
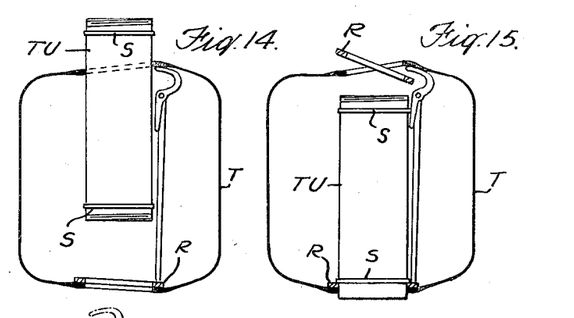
Figures 16, 17:
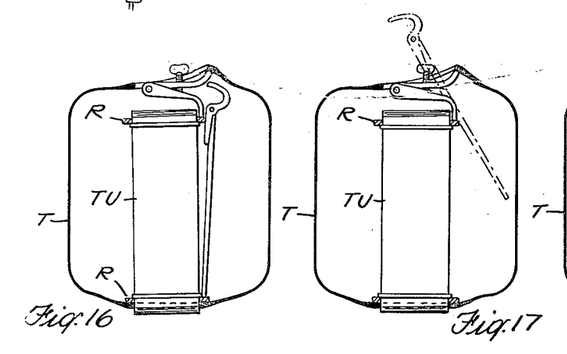
Figure 18:
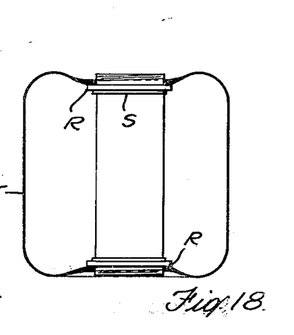

Next the tube is axially elongated by a tool such as the toggle tool indicated in FIG. 13, the tool bearing against the ring R at one end and against the bead of the opposing hub opening with its other end. The tube TU is then dropped in through the top opening, as shown in FIG. 14 and is caused to enter the ring R previously inserted, as shown in FIG. 15. The upper end of the tube is thus free and the other inner ring R is then inserted and placed on the upper end of the tube against its shoulder, as shown in FIGS. 15 and 16. A special tool is then inserted, as shown in FIG. 16 which, bearing against the top ring, lifts the tire bead so as to release the toggle tool, the toggle tool is then removed, as indicated in FIG. 17 and with the removal of the special tool the tire resumes its normal shape with the rings R bearing against the inner faces of the beads and the ends of the tube projecting through the respective hub openings of the tire. This condition is indicated in FIG. 18. When the tire is secured to the tube, the latter becomes the permanent drive axle of the wheel and the tube will ordinarily be removed only in case of replacement of the tire. As will be seen, the drive unit and associated elements which are housed in the tube may be freely removed and inserted without affecting the tube's relation to the tire, and the condition of inflation of the tire is entirely independent of the presence or absence of the elements housed by the tube.

Figure 2:
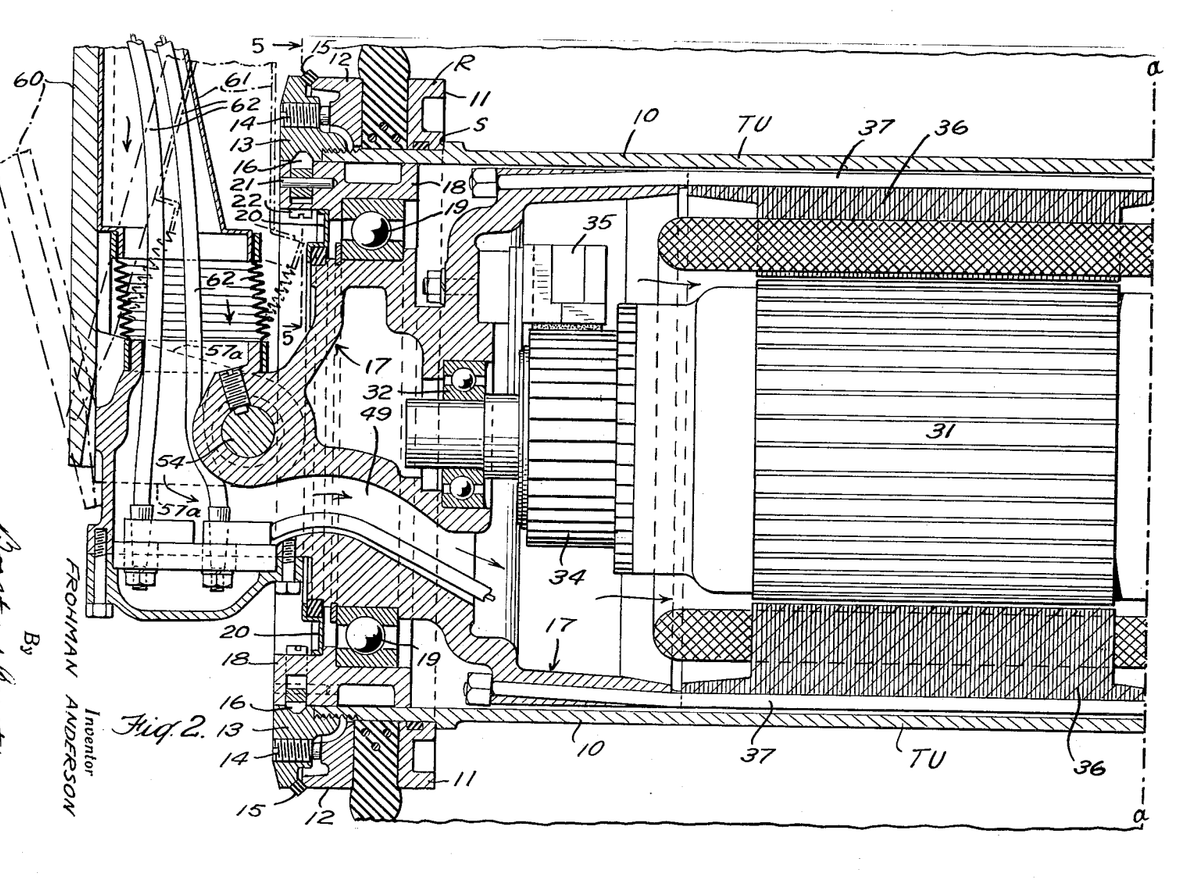
FIGS. 2 and 2A together are a longitudinal vertical section of the hub mechanism of a wheel comprising the tubular axis and the contained motor, gear and brake mechanism and the lower ends of the supporting arms and air conduits, the two figures being joined on the common line a—a.
Figures 2A, 6:
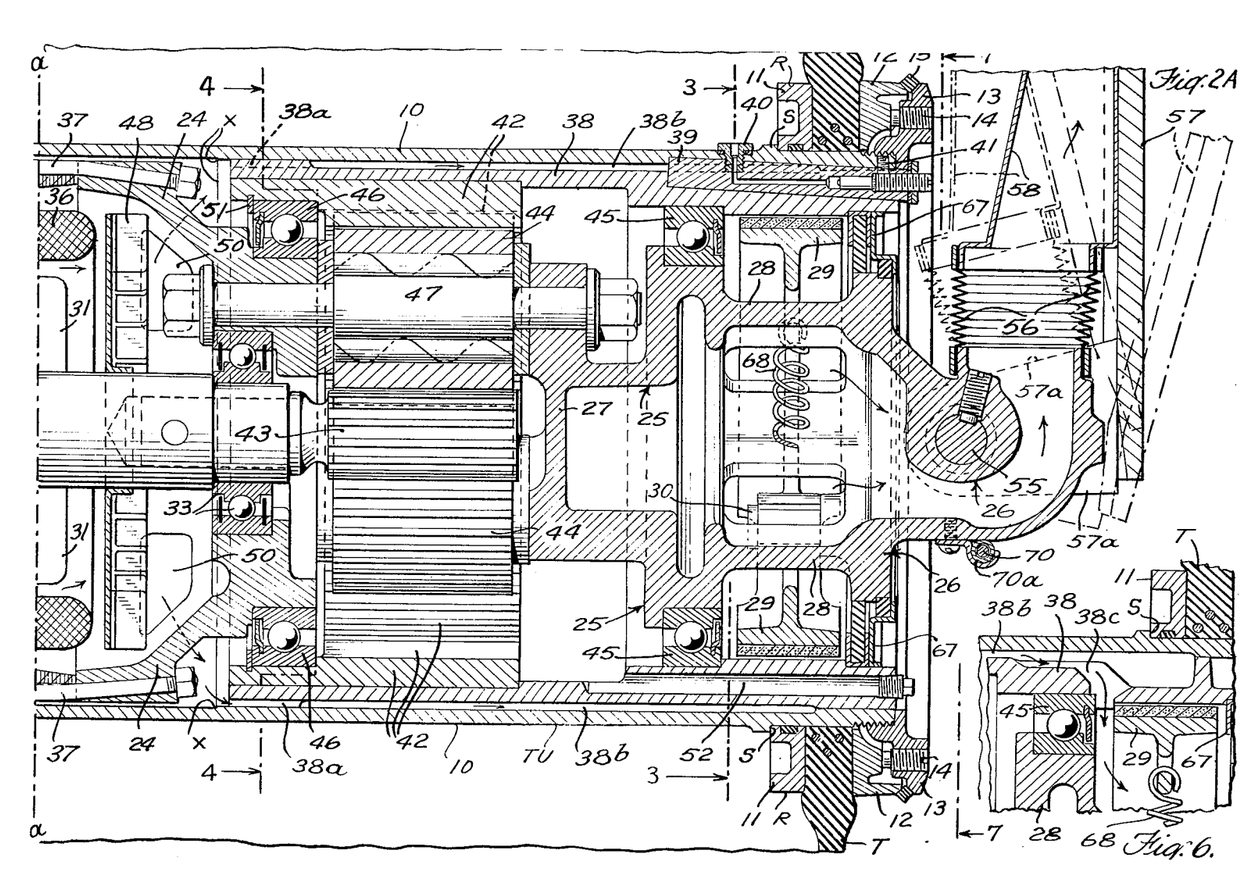
FIG. 6 is a fragmentary section on enlarged scale taken on line 6—6 of FIG. 3.

Combined FIGS. 2 and 2A show in mechanical detail the assembly shown in FIG. 18 with the power unit and its associated elements in the tube and the tire hermetically clamped to the tube.

The tube 10 (above designated TU) is disposed in the tire T with the rings 11 (above designated R) against the shoulders S and the bead of the tire which surrounds the end openings is on each end clamped between the inner ring 11 and an outer clamp ring 12 which has a sliding fit over the protruding end of the tube. The extreme end of the tube is screw threaded and a bearing ring 13 screws on each screw threaded end and has axially disposed set screws 14 at intervals through its wall and bearing against the outer ring 12. The tightening of these set screws serves to clamp the tire bead and effect an air seal. This seal is further assured by an elastic seal ring set in a groove on the inner face of each ring 11 and by an annular seal on the inner face of the outer clamp rings 12. The outer entrance to the annular space between rings 12 and 13 is also sealed by rubber seal 15 against the admission of water, mud, sand or the like.

Both bearings rings 13 are shouldered on their inner face, being threaded and of larger diameter for the inner portion of its inner periphery and of smaller diameter and unthreaded for the remainder of this periphery. These bearing rings are, therefore, screwed on to the tube end until the shoulder bears against the end of the tube 10. The proportions are such that this leaves a space between rings 12 and 13 which is closed by the seal above mentioned. At one end means including pivoted arcuate wedges 16 are shown to lock the bearing rings. This feature is shown in greater detail in FIG. 5.

These wedge locks are shown as provided for the bearing ring 13 on the end of the hub and axle mechanism shown in FIG. 2 which is the motor and air entrance end. This end of the tube is closed by a two part construction comprising a hub cap which is designated generally by the numeral 17 and is a casting of complex shape and is non-rotative, and a surrounding annular casting 18 which is fitted in the end of the tube 10 and rotates therewith, bearing on the non-rotative casting 17 through ball bearings 19. An annular sheet metal shield 20 seals the annular space between the non-rotative casting 17 and the rotative ring casting 18 in which the ball bearings are located.

Figure 5:
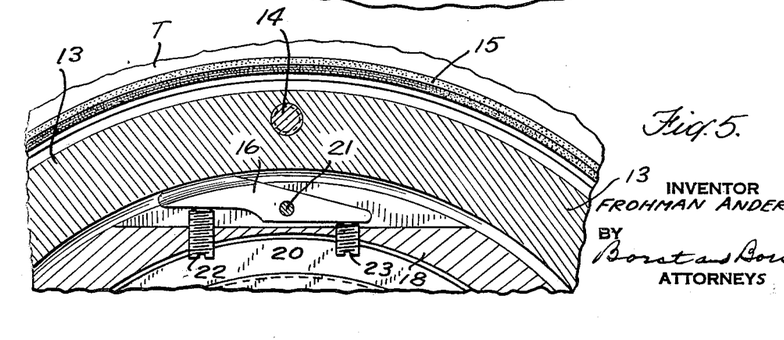
FIG. 5 is a fragmentary section on enlarged scale taken on line 5—5 of FIG. 2.

The ring casting 18 is recessed at intervals on its outer portion opposite the bearing ring 13 to receive the pivoted wedge 16. As shown in FIG. 5, these wedges are each pivoted on a pivot 21 and are controlled in position by two screws 22 and 23 in ring casting 18. The bearing ring 13 is circumferentially grooved in the inner face of its unthreaded portion and the wedges 16 are located to enter the groove. The wedges are locked in the groove by setting up on the screws 22 with the screws 23 adjusted, and the setting up on screws 23 will rotate the wedges out of the groove with the screws 22 adjusted. This wedge action serves additionally to secure the ring casting 18 to the tube 10 to be caused to rotate therewith.

The interior of the tube 10 is divided into three chambers, viz., a motor chamber, a gear chamber and a brake chamber. Intermediate the ends of the tube is a casting which constitutes an intermediate bearing wall 24 that is non-rotative and with end casting or cap 17 defines the motor chamber. At the other end of the tube is a casting 25 to which is attached hub casting 26, the two castings being non-rotative and serving as an end cap to close that end of the tube. The casting 25 is of complex shape with the bearing wall 24 defines the gear chamber. It has an inward triangular extension 27 that cooperates with the bearing wall 24 to provide bearings for the gears. On its outer face the casing 25 has four axially extending arms 28 which are rectangular in cross section and together form a quadrilateral partially enclosed space with the hub casting 26 attached to their outer ends. Radially outside of the arms 28 are brake shoes 29 pivoted on pivot 30 which are manually operated and frictionally engage on the inner periphery of a shell in this end of the tube as a brake drum, as will later be described. Thus the outer end portion of the casting 25 provides a brake chamber.

The motor is an electric motor supplied with current by a motor generator set carried by the vehicle. The armature 31 of the motor is the rotor and bears at one end in the end casting 17 through ball bearings 32, and at the other end in bearing wall 24 through ball bearings 33. The commutator 34 on the armature is engaged by a brush in brush holder 35 secured to the casting 17.

The stator field member 36 of the motor is of conventional laminated construction with grooves in its inner periphery in which the field coils are arranged. It is clamped between an annular peripheral flange on the inner face of casting 17 and a similar flange on the opposing face of the bearing wall 24 through tie bolts 37 which are laid in grooves in the outer face of the field member with their ends slightly bent toward the center and passing through inclined holes in the flanges of the casting 17 and bearing wall 24. This inclination brings the ends of the tie bolts away from the tube wall sufficiently for them to receive nuts. The field laminations are thus tightly clamped and are rigidly held in static condition.

The portion of the interior of the tube from the bearing wall 24 to its other end has fitting in it a shell 38 as a liner, shown in FIG. 2A. As will later appear, this shell forms part of the assembly that is removable as a unit from the tube 10. To facilitate the removal of the shell 38 the inner periphery of the tube 10 varies slightly in diameter in its sections occupied and not occupied by the shell. The difference is but a few thousandths of an inch, the change being indicated at the inner circumferential line x in FIG. 2A. At the left of that line as seen in that figure the diameter is increased slightly, with the result that as the shell clears that line moving toward the left it is relatively free and moves easily, while in the portion at the right of that line, the shell has only a sliding fit with perhaps one thousandths of an inch difference in diameter.

As shown, the shell has its full outside diameter for only a short length at each end, the intermediate portion of its outer periphery being reduced and providing substantial clearance, which, as we shall see, serves as an air passage. It fits and bears at its ends and thus affords ample bearing for the drive gearing the force of which is received by the shell.

The shell 38 is keyed to the tube 10 by a key 39. This key is seated in registering keyways in the shell and in the tube and it is attached to the tube by screws 40 and 41, being inclined downwardly on its bottom toward the outer end so as to minimize the drag of the shell on the key as the shell slides out of the tube. A longitudinal air passage extends from its outer end partially through the key and at its inner end communicates with a lateral or radial passage that leads up through the screw 40 into the interior of the tire. The tire is inflated through this passage, which has the usual valve in its outer end. Thus it will be seen that the power unit may be removed and replaced without affecting the inflation of the tire.

In the space between the outer face of the bearing wall 24 and the inner face of the triangular projection 27 on casting 25, there is non-rotatively secured on the inner wall of the shell 38 an internally toothed ring gear 42 which is engaged by planetary gears driven by the motor armature in this gear chamber.

Figure 4:
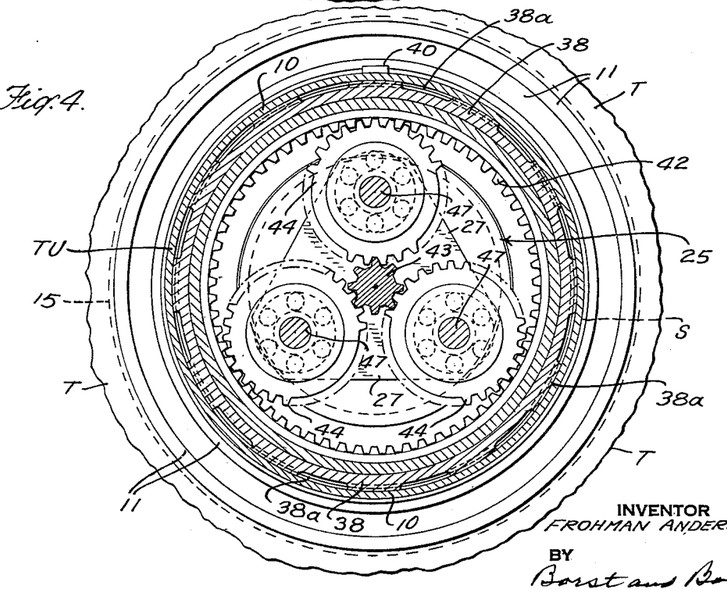
FIG. 4 is a transverse section on the scale of FIG. 3 taken on line 4—4 of FIG. 2A.

As shown in FIGS. 2A and 4, the armature shaft extends beyond its bearing in ball bearings 33 and has on its end a pinion 43 in transverse registry with and central of ring gear 42, and meshing with three transmission planetary gears 44 that mesh with the ring gear 42. Through this gear drive the rotation of the armature rotatively drives the shell 38 and through key 39 the tube 10 is driven and hence the tire. At its outer end just inside the brake chamber the shell bears on casting 25 through ball bearings 45, and on its inner end the shell bears on bearing wall 24 through ball bearings 46, the ring gear 42 having an axial extension in which the outer ball race is carried. The planetary gears 44 through roller bearings bear on fixed hubs 47 the reduced ends of which are received respectively in bearing plate 24 and in the triangular wall 27 of casting 25 and are provided with clamping nuts on their threaded ends which securely clamp the wall and casting to the hub shoulders through interposed washers.

To cool the motor, air is caused to circulate through the interior of the tube over the armature through passages and means which will now be described.

Fixed on the armature shaft at the bearing wall end and inside the bearing wall flange is a fan 48. In the end casting 17 is an air inlet passage 49 which leads into the stator enclosure. The bearing wall 24 is provided with openings 50. The ball bearings 46 are sealed at their inner ends, as shown in FIG. 2A, so that there is no communication between the gear chamber and the space about the wall 24 outside the openings 50, and a snap ring 51 in a groove in the extension of ring gear 42 bears against the inner face of the outer ball bearing race of bearing 46, the inner end of which bears against the shoulder between the gear ring and its extension. Thus the shell 38 and its contained parts are caused to move axially as a unit with the motor and its attached parts.

Figure 3:
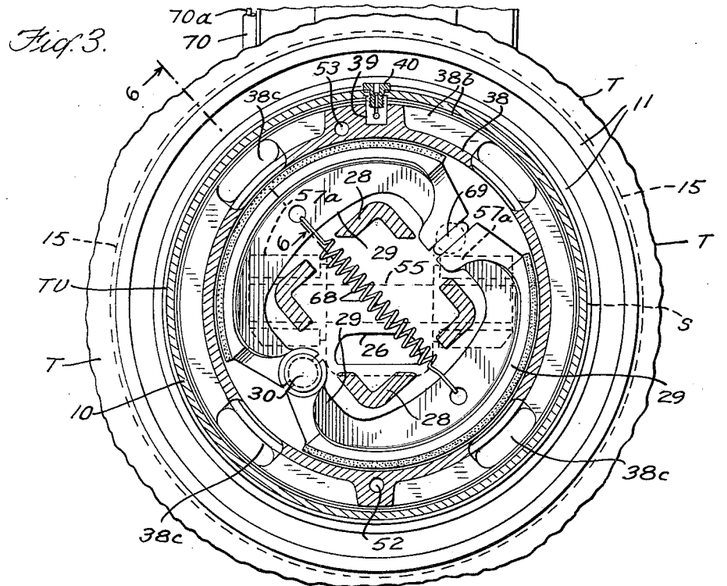
FIG. 3 is a transverse section on reduced scale, taken on line 3—3 of FIG. 2A.

To provide passage for the air circulated by the fan 48 through the shell chamber, the outer peripheral wall of the full diameter portion of the shell 38 at its inner end is provided with air passages 38a (see FIG. 4) which lead to the annular space 38b about the reduced peripheral portion of the shell. As shown in FIGS. 3 and 6, four passages 38c are provided through the shell 38 at the inner end of the brake chamber, the outer end of the brake chamber being open to the circulated air.

Thus it will be seen that the fan draws the air in through passage 49 and causes it to circulate, as indicated by the arrows, over the armature between the motor stator and rotor, through openings 50, thence through openings 38a, passage 38b, through openings 38c into the brake chamber and out of casting 26 at the exit end of the tube 10.

The gear chamber is provided with lubricating oil so that the gearing runs in oil. In the illustrated construction this chamber includes the space about the triangular wall 27 which adjoins the ball bearings 45, and it is therefore necessary to provide a seal for those bearings, as is shown, as well as for the bearings 46 in order to confine the oil to the gear chamber.

To introduce oil as well as to provide for flushing the gear chamber, two axial drain passages 52 and 53 are provided in the shell 38, as shown in FIG. 3, leading from its outer end and opening into the gear chamber, as shown in FIG. 2A. These drain passages are closed by screw plugs and the two passages provide means for filling and draining as well as flushing.

Each end casting is provided with a pivot pin or stub shaft for pivotal connection with the vehicle in such a way as to allow each wheel to tilt on its axis relative to the vehicle, whereby each wheel can accommodate itself to the terrain without materially affecting the equilibrium of the vehicle body, the connection also making provision for steering.

The casting 17 has a pin receiving projection which extends outside the end of tube 10 in which is non-rotatively secured pivot pin 54 extending horizontally at right angles to the tube axis, and similarly casting 26 has an integral outward extension in which is non-rotatively secured pivot pin 55 parallel to pin 54. The outward extension of casting 26 provides a passage for the current of forced air terminating at its top in an open mouth to which is attached a flexible conduit connector 56.

Figure 7:
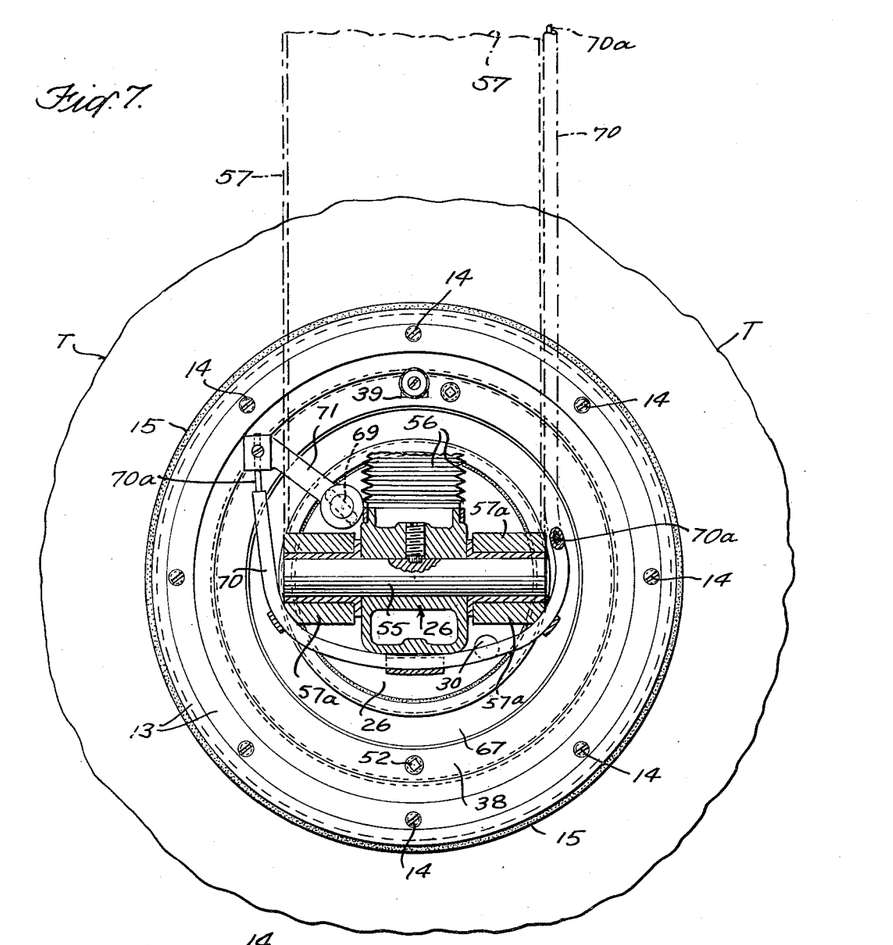
FIG. 7 is an enlarged transverse section taken on line 7—7 of FIG. 2A.

The pivot pin 55 extends at each end beyond the end walls of the extension of the casting 26 and an upwardly extending arm 57 which is preferably arcuate in cross section has a bifurcated hub 57a the two parts of which bear upon the ends of pin 55 through washers as shown in FIG. 7.

Attached to and movable with the arm 57 is a preferably metal conduit 58 which is hermetically attached at its lower end to the flexible connector 56 and extends with its upper end well above the wheel, being open at its upper end.

Similarly the pin 54 is housed in an enclosing casting 17 which provides an entrance passage for the air and through the lateral walls of which the pin 54 extends on each end and provides a bearing for the bifurcated hub of an upstanding arm 60 similar to arm 57 and having attached thereto a conduit 61 which is hermetically attached at its lower end to a flexible connector 62 that is connected to the mouth of casting 17. This conduit 61 extends upwardly the same distance as conduit 58. This conduit 61 provides an entrance duct for the air and also houses the electric wires 62 for the motor, having connection with the motor leads as shown in FIG. 2.

The arms 57 and 60 have a parallel motion connection with the vehicle as shown in FIGS. 1 and 8. Extending down over each wheel from an overhang body part of the vehicle is a tubular support 63 which in practice is made to absorb shock, being preferably made in two telescopic parts normally held expanded through a coil spring coupling. The arms 57 and 60 are parallel and are connected through two links 64 and 65, which are pivoted at their ends to the respective arms and at their centers to the tubular support 63. As shown, the links 64 and 65 are bowed, the latter being shaped to allow clearance of the wheel tire for maximum steering angle. The conduits 58 and 61 are shown as terminating at their upper ends at link 64 with a cowl 66 overhanging the upper ends to exclude rain or other falling water or the like.

With the wheels thus supported by the vehicle, it is evident that the wheel axes are free to tilt relative to their support, FIG. 8 showing substantially the maximum angle of tilt. This tilting potential is irrespective of the angular position of the wheel about its vertical or steering axis.

It is apparent that by reason of the air inlet and exhaust being well above the wheels, the vehicle may safely be driven into water deep enough to submerge the wheels. This, of course, necessitates effective sealing of the ends of the tube 10 and this is accomplished in the manner and by the means shown. As above stated, the sheet metal seal 20 effectively seals the bearing space between castings 17 and 18. Similarly, sheet metal seal 67 together with rubber gaskets shown in FIG. 2A effectively seals the bearing space between the outer peripheries of castings 25 and 26 and the inner rotative periphery of shell 38.

Each wheel is provided with a manually operated brake the construction of which is shown in FIGS. 2A, 3 and 7.

The brake shoes 29 which have the usual brake lining on their outer face are shaped concentric with the opposing portion of the inner face of shell 38 which serves as the brake drum. A retractile coil spring 68 extends across the rectangular space marked by the arms 28 and is connected to the brake shoes 29 and rotate them about pivot 30 and hold the shoes clear of the shell surface. Between the free ends of the shoes is the conventional cam 69 the rotation of which upon its axis will spread apart the free ends of the shoes and expand the shoes, bringing their brake lining into contact with the shell surface and applying the brakes.

The manually operated means for applying the brakes are shown particularly in FIG. 7. A flexible shaft or cable 70 of the type having a slidable core wire is attached to arm 57. The cam 69 is rotatively mounted on an axis parallel with the end faces of the shoes, being carried by the hub of a lever arm 71, the free end of which is attached to the slidable wire 70a of the flexible cable 70. The operation of the wire 70a rotates the lever 71 and applies and releases the brakes.

The brake cables for all four wheels lead to a common point and means which are not shown may be used to apply all of the brakes simultaneously and in addition each wheel has its individual brake applying control.

The entire contents of the tube 10 shown in FIGS. 2 and 2A including the motor and the shell 38 with its contained gearing and brake mechanism and the end castings 17, 25 and 26 are inserted and removed from the tube as a unit. The hubs 57a of arm 57 and the corresponding hubs 60a of arm 60 (see FIG. 8) are disengaged from their respective pivot pins 55 and 54 and the tube contents are slid out to the left as shown in FIGS. 2 and 2A. The full diameter peripheral annular areas at the ends of shell 38 snug the interior of tube 10 until they reach the region of larger diameter at line x and thereafter the unit moves freely. Likewise on insertion the unit moves freely until the full diameter shell portion reaches line x.

The parts are tied together from end to end by the tie rods 37 and by the nuts on the hubs 47 of the planetary gears, with the exception of the shell 38. That is caused to move out with its contents by the snap ring 51 and to move in by the bearing of the outer ball bearing races 46 against the shoulder on the ring gear 42.

While the invention has been explained in connection with a single embodiment, it will be understood that various modifications in the construction shown in the drawings and above particularly described will readily suggest themselves to those skilled in the art within the scope of the invention as defined in the following claims.

I claim:

1. A wheel construction comprising a tubeless pneumatic tire having an axial hole on each end, power drive means disposed within the tire and comprising an axial tube adapted to wholly contain a prime mover, said tube being of substantially the same diameter as said axial holes and spanning and fitting in said holes and protruding therefrom on each end, an annular outwardly facing shoulder near each end of the tube and disposed within the tire adjacent the respective end wall, a removable inner clamping ring loosely fitting on the tube at each end within the tire and bearing against the respective shoulder, an outer clamping ring on each protruding end of the tube and cooperating with the adjacent inner ring to clamp the respective end wall of the tire between the rings about the said opening, said clamping rings being of larger diameter than the axial holes in the tire, the protruding ends of the tube being screw threaded and in which the outer rings fit freely over the protruding ends of the tube, together with internally screw threaded rings screwed on to the protruding ends of the tube outside said outer clamping rings and axially disposed set screws in the internally screw threaded rings bearing against the respective outer clamping rings.

2. The combination defined in claim 1 in which the internally screw threaded rings are internally shouldered and bear with the shoulders against the respective ends of the tube and limit the entrance of the shouldered rings on to the tube.

3. The combination defined in claim 1 in which the internally screw threaded rings have a screw threaded portion extending partially axially through the ring from one edge and have an unthreaded portion extending from the other edge and reduced in internal diameter, thereby providing an internal shoulder engageable with the end of the tube, one of said axial holes being partially enclosed by a rotative annular casting and one of said rings has an internal circumferential groove in the unthreaded portion, together with at least one wedge member pivoted on a pivot axially disposed in said casting to be moved into and out of said groove, and means to adjust each wedge about its pivot.

References Cited by the Examiner

UNITED STATES PATENTS

| | | | |
|---|---|---|---|
| 476,764 | 6/92 | Hall | 152—9 |
| 1,376,921 | 5/21 | Chandler | 180—10 |
| 1,582,595 | 4/26 | Goldsmith | 152—405 |
| 1,657,014 | 1/28 | Klaus | 29—159.1 |
| 1,690,240 | 11/28 | Norcross | 29—159.1 |
| 1,876,068 | 9/32 | Musselman | 152—9 |
| 2,726,726 | 12/55 | Tourneau | 180—10 |
| 2,796,266 | 6/57 | Sells | 280—29 |
| 2,824,592 | 2/58 | Neisler et al. | 152.9 |
| 2,868,262 | 1/59 | Straussler | 152—401 |
| 2,874,759 | 2/59 | Ranallo | 157—1.1 |
| 2,899,005 | 8/59 | Speicher | 180—10 |
| 2,910,117 | 10/59 | Lamerson | 157—1.1 |
| 2,981,548 | 4/61 | Taylor | 280—29 |
| 3,016,967 | 1/62 | Rehfeld | 180—10 |
| 3,024,830 | 3/62 | Bowersox | 152—9 |

FOREIGN PATENTS

| | | |
|---|---|---|
| 866 | 6/11 | Great Britain. |
| 354,556 | 8/31 | Great Britain. |

A. HARRY LEVY, *Primary Examiner.*

PHILIP ARNOLD, *Examiner.*